United States Patent [19]

Sharp

[11] Patent Number: 5,102,481

[45] Date of Patent: * Apr. 7, 1992

[54] METHOD OF BUILDING DOUBLE WALLED FIBROUS REINFORCED RESINOUS STORAGE TANKS WITH COMMON RIB SUPPORTS

[76] Inventor: Bruce R. Sharp, 7685 Fields-Ertel Rd., Cincinnati, Ohio 45241

[*] Notice: The portion of the term of this patent subsequent to Apr. 26, 2005 has been disclaimed.

[21] Appl. No.: 658,548

[22] Filed: Feb. 21, 1991

Related U.S. Application Data

[60] Division of Ser. No. 343,853, Apr. 26, 1989, Pat. No. 5,020,358, which is a continuation-in-part of Ser. No. 186,190, Jul. 5, 1988, Pat. No. 4,875,361.

[51] Int. Cl.$^5$ .......................... G01M 3/00; B32B 17/04
[52] U.S. Cl. ........................... 156/69; 156/172; 156/187; 156/189; 156/292; 29/455.1; 73/49.2
[58] Field of Search .................. 73/49.1, 49.2, 49.3; 29/455.1; 220/420, 445, 446, 466, 469; 156/69, 166, 169, 171, 172–175, 189, 190, 187, 191, 292

[56] References Cited

U.S. PATENT DOCUMENTS

| | | | |
|---|---|---|---|
| 3,335,904 | 8/1967 | Anderson . | |
| 3,655,468 | 4/1972 | Bastone et al. | 156/189 X |
| 4,640,439 | 2/1987 | Palazzo | 220/455 |
| 4,739,659 | 4/1988 | Sharp | 220/445 X |
| 4,875,361 | 10/1989 | Sharp | 73/49.2 T |

*Primary Examiner*—Jeff H. Aftergut
*Attorney, Agent, or Firm*—Charles R. Wilson

[57] ABSTRACT

A method of making a storage tank comprises forming a cylindrical-shaped inner tank with integral support ribs and forming an outer wall comprised of a series of sections which are at least partially separated from the inner tank's walls between each set of support ribs. Each outer wall section is bonded to side walls of adjacent ribs at a distance of less than about 90% of the height of the support ribs such that the ribs protrude from the outer surface of the storage tank system. The inner and outer walls of the system are both strengthened by the common support ribs. Secondary containment is provided by the outer wall. A monitored storage tank system is provided by the use of a leak detection means to monitor the closed space defined by the rib interiors, the outer wall and the storage tank.

10 Claims, 2 Drawing Sheets

METHOD OF BUILDING DOUBLE WALLED FIBROUS REINFORCED RESINOUS STORAGE TANKS WITH COMMON RIB SUPPORTS

This is a division of "Double Walled Fibrous Reinforced Resinous Storage Tanks With Common Rib Supports", Ser. No. 07/343,853, filed Apr. 26, 1989, now U.S. Pat. No. 5,020,358, which is a continuation-in-part of "Double Walled Storage Tanks With Common Rib Supports", Ser. No. 07/186,190, filed July 5, 1988, now U.S. Pat. No. 4,875,361.

FIELD OF INVENTION

This invention relates to storage tanks. More particularly, the invention relates to ribbed underground storage tanks which are double walled.

BACKGROUND OF THE INVENTION

Commercial and industrial storage tanks are widely used for the bulk storing of liquids. Many of these liquids are highly corrosive and/or are flammable. They pose a significant health and safety hazard if not properly contained. Federal as well as local regulations govern the structure of certain storage tanks.

Heightened public awareness of the danger posed by storage tanks (particularly underground gasoline storage tanks) has led to additional governmental regulations. Recent proposed regulations will soon require most storage tanks to have secondary containment means and possibly a fail safe design feature to guard against accidental soil, water, and air contamination. Secondary containment means must be capable of containing leaked liquid from the storage tank. Rigid double walled tanks made from sheet metal have been suggested as one alternative. While effective for containment purposes, such tanks, as presently available, are costly to build and difficult to install because of their weight. The tanks are built by basically forming two rigid tanks and placing one inside the other.

Tanks made from fiberglass reinforced resinous material are also extensively used. Different methods are used for making these tanks. One commercial method of making tanks from fiberglass reinforced resinous material utilizes a removable split half-mold with shapes for forming the support ribs and end cap along with the main body. After fiberglass and resinous material are applied to the mold and cured, the mold is removed. Next, the interior portions of the rib areas are filled with a filler material or bridged over with a cardboard insert and, fiberglass/resin applied so as to form a substantially smooth tank interior. A second tank half is formed in the same manner and joined with the first tank half. The formed tank is representative of those tanks wherein the support ribs are integrally built into the inner tank as initially made. A double walled tank is made essentially by forming two additional horizontal tank halves, placing the initial single walled tank inside one horizontal half-tank and joining the second horizontal half-tank to the first.

U.S. Pat. No. 4,561,292, contains a description of another method of building a double walled storage tank. As is readily apparent from the patent and above discussion, building a double walled storage tank system with fiberglass and resin by known methods is very labor intensive and costly. Recent concerns about leaked tanks has heightened the need for an efficient and economical manner of building double walled storage tank systems.

There has now been discovered a method whereby storage tanks are built with a double wall for secondary containment in an efficient, yet economical manner. Such tanks can also be equipped with means to monitor for any leakage.

SUMMARY OF THE INVENTION

A method of building a strengthened double walled ribbed storage tank system with secondary containment capability utilizes as a inner tank a cylindrical-shaped tank having a set of integral spaced exterior protruding ribs extending circumferentially around the tank. An outer wall is formed over the inner tank by providing a series of wall sections which are at least partially separated from the inner tank's walls between each set of spaced support ribs. Each section of said outer wall is bonded to the side walls of the support ribs at a distance less than about 90% of the height of the support ribs such that the ribs still protrude from the outer surface of the storage tank system. Each section derives its strength from the support ribs so as to withstand external and internal load forces and act as a secondary containment means to contain any liquid which may leak from the inner tank. Provision can be made to monitor the interior spaces defined by the outer wall sections and inner tank walls.

DETAILED DESCRIPTION OF THE INVENTION

Figure 1:
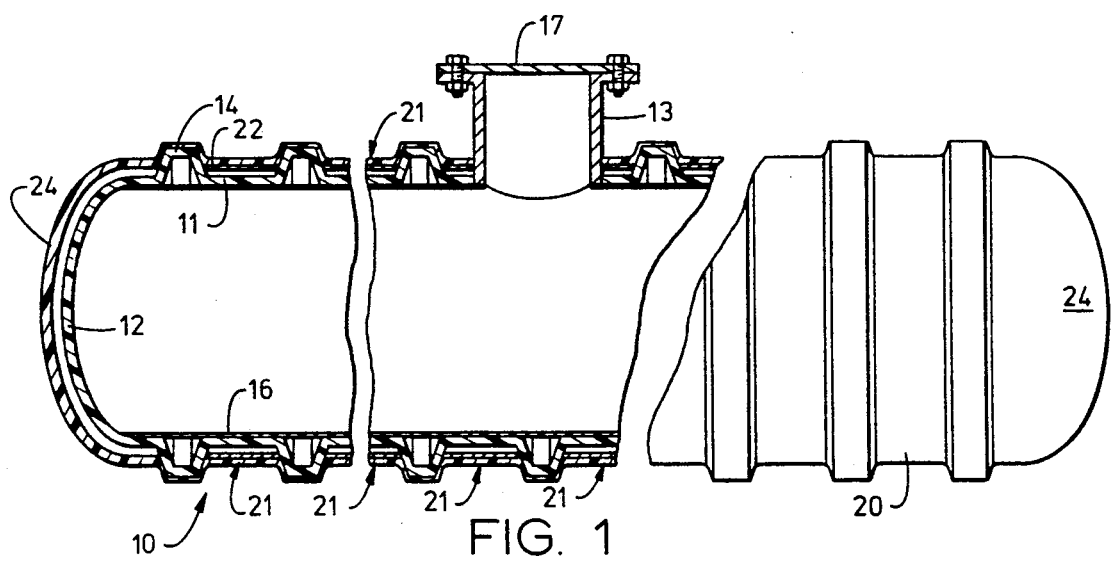
FIG. 1 is a side view of a double walled ribbed storage tank system having support ribs surrounding an inner tank and sections of a solid sheet material over spaces between the ribs.

With reference to FIG. 1, there is shown a double walled storage tank system 10. The inner storage tank of the type used in FIG. 1 is well known and is widely used, especially in the gasoline service station industry. Such tanks comprise main body 11, end caps 12, and manhead 13. The tank is made of a conventional fibrous reinforced resinous material. Ribs 14 are an integral part of the inner tank. That is, tank 11 is made by a method wherein the cylindrical-shaped main body and ribs are formed together on a removable mold. End caps 12 can be formed separately and bonded to the main body of the tank in a distinct step or formed with the main body 11.

Most inner storage tanks of the type described are modified by adding a continuous interior wall over the rib recesses 15. Alternatively, the recesses 15 alone are covered. The purpose of this added step is to provide a storage area with a smooth sloped bottom to facilitate liquid removal. As shown, a continuous smooth surfaced wall 16 is formed inside the inner tank to cover the rib recesses. The rib areas of the tank are thus double walled while the main body of the tank is single walled. A sufficient number of openings are found in the storage tank 11 to allow for various access lines to the interior of the tank. For instance, a fill pipe, dispensing line and vent pipe can enter the storage tank at various points in the tank's surface, but preferably all enter through the cover 17 and the manhead 13. The inner tank 11 as described is commercially available.

In accord with this invention, an outer wall comprised of a series of sections is formed over the inner tank. Each section is at least partially separated from the inner tank's walls and is bonded to the side walls of adjacent support ribs. The sections are bonded at a distance of less than about 90% of the height of the support ribs as measured from the exterior surface of the main body. In effect, the top portions of the ribs protrude from the outer surface of the storage tank system. It has been found that constructing a double walled storage tank in this manner utilizes the support ribs to strengthen both the walls of the inner tank 11 and the outer wall. In effect, a double walled tank system is obtained in an efficient and economical fashion.

In a preferred embodiment, the wall sections are bonded to the side walls at a distance of less than about 75% of the height of the ribs. In a more preferred embodiment, each wall section is bonded at a distance of from about 1% to about 50% of the height of the ribs.

Figure 2:
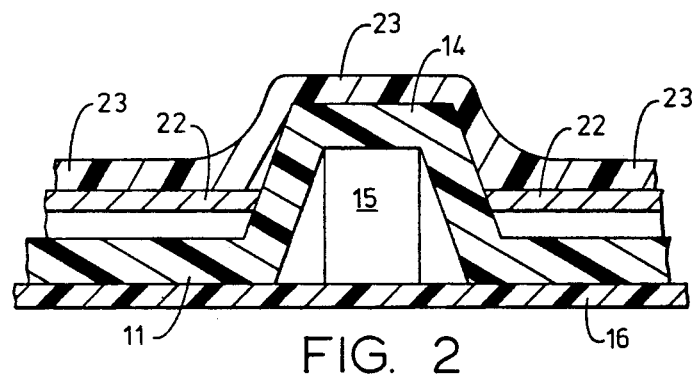
FIG. 2 is an enlarged sectional view of a support rib found on the storage tank system of FIG. 1.

One method of forming the outer wall 20 formed of wall sections 21 and which is illustrated in FIGS. 1 and 2 is to place solid sheet material 22 between the ribs. The sheet material is then bonded to the support ribs. Examples of such solid sheet materials include metal sheets and fiberglass/resin sheets. The metal sheet can be a thin gauge steel sheet with a diamond grid pattern on the surface which faces the inner tank. The fiberglass resin sheet preferably has a stucco appearance on the side facing the inner tank. It is, thus, preferred that the solid sheet material has an irregular surface on at least one side to ensure a seal is not formed by its contact with the inner tank walls.

The bonding technique used to secure the wall sections 21 to the side walls of the support ribs will depend on the materials of construction of the wall sections, per se. Preferably, the outer wall sections are made of a fibrous reinforced resinous material and an overlay 23 of resinous material is used.

Outer end caps 24 can be preformed, preferably of fiberglass reinforced resinous material and positioned over the inner tank's ends. A space between the end caps is provided for. As shown, the end cap 24 is bonded to a rib support 14.

The shape of the outer wall is such that it encases the end caps 12 and the surface areas of tank 11 between ribs 14 to form a closed space. The outer wall 20 itself is capable of containing any liquid which is stored in the storage tank and which has leaked therefrom. The outer wall gains strength from the angular support ribs. Most importantly, a double walled tank is built with only one set of ribs. The ribs 14 strengthen both the inner tank 11 and the outer tank 20. The result is a storage tank system which is economically built with a minimum of labor intensive steps and which has sufficient strength without excessive wall thickness to meet or exceed mandated structural requirements. The walls of the storage tank system are both able to withstand internal and external load forces encountered during use.

Figure 3:
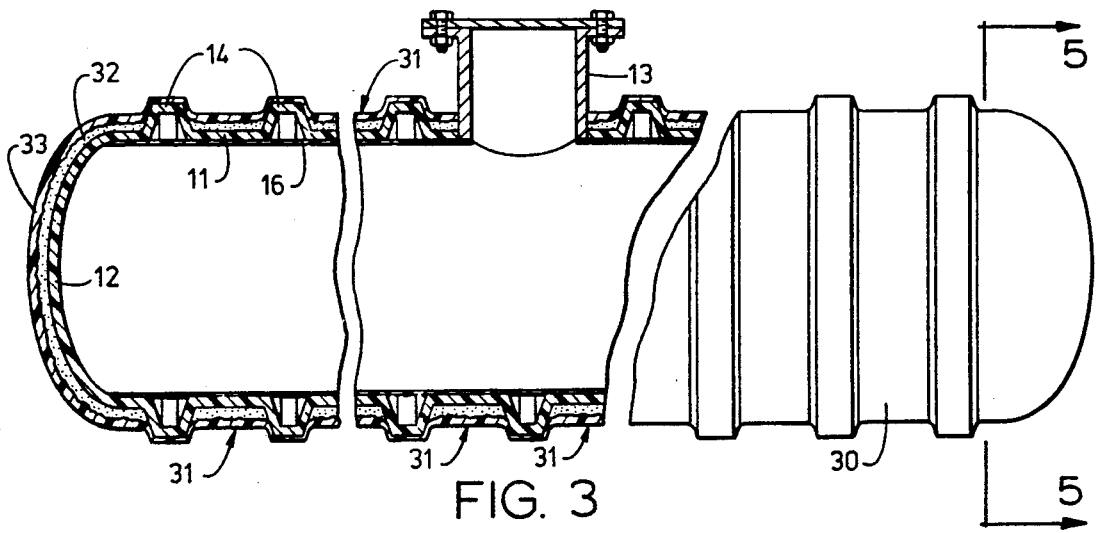
FIG. 3 is another double walled ribbed storage tank system of this invention wherein outer wall sections are made from fibrous reinforced resinous material.

Outer wall 30 shown in FIG. 3 is a fibrous reinforced resinous material. The wall sections 31 are formed in one method by first applying layers of fibrous reinforcing material 32, e.g. fiberglass on the outer surface of the tank 11 between the ribs and on the end caps. The fibrous reinforcing material can take on many different physical shapes and structures, variously referred to as mattings, nets, screens, meshes, and chopped strands. Examples of fibrous materials include fiberglass, nylon, and other synthetic fibrous materials. The fibrous material, if in sheet form, is laid onto the storage tank as a continuous matting. The thickness of the fibrous material is great enough that a subsequently applied resinous material as discussed in the following paragraph will not be able to completely penetrate through it and seal to the inner tank 11.

Once the fibrous reinforcing material is applied, a resinous material is next applied to the reinforcing material and thereafter cured. Several different resinous materials are known for the purpose of reinforcing fibrous material. Such materials include polyesters, e.g. vinylesters, isophthalic polyesters, polyethylene, polypropylene, polyvinylchloride, polyurethane, and polyepoxide. The listed resinous materials used in the construction of the wall sections are not all inclusive, but only illustrative of some of the resinous materials which can be used.

Alternatively, the fibrous material is applied in the form of chopped strands along with the resinous materials described in the previous paragraph. In this embodiment, a separating material discussed in following paragraphs must be applied to the inner tank walls to keep the inner and outer walls separated. Thus, the chopped strand and resinous material are sprayed from separate nozzles of the same spray gun and the outer wall sections formed therefrom on the separating material as the resin cures. Necessarily, there will be some overlap of spray materials onto the top surface of the support ribs. Still another method of forming the outer wall sections is by filament windings. In this method continuous reinforcing fibrous strands are impregnated with resinous material and then wrapped in a crossing pattern over the inner tank. A separating material must be used in this method also.

When needed, a separating material having an impervious outer planar surface is applied to the surface area on the inner tank's outer surface between the ribs 14, including end caps 12. The purpose of the separating material is to ensure that the subsequently applied fibrous reinforcing material and resinous material which form the outer wall 30 comprised of the wall sections 31 and outer end cap 33 will not seal to the inner storage tank.

Separating materials include solid polymeric films as well as foraminous or porous materials which are sealed on at least one side. Many pliable or semi-rigid materials are usable. Examples of such material are polyethylene, jute, polyurethane foam, polyester foam, polyether foam, fiberglass matting, cotton matting, nylon matting, corrugated cardboard, and asbestos which range from about 0.1 inches to almost 1.0 inch in thickness. A heat seal or sealing material, e.g. a polymeric coating, is used on one surface of any foraminous materials when needed to prevent substantial saturation with a subsequently applied resinous material, Wax, which is subsequently heated and removed is also used as a separating material.

Figure 4:
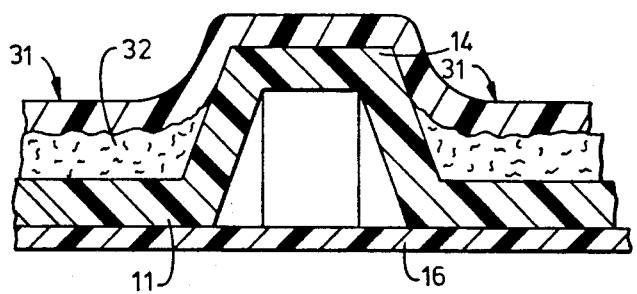
FIG. 4 is an enlarged sectional view of a support rib area found on the storage tank system of FIG. 3.
Figure 5:
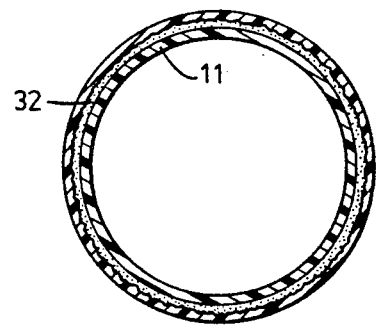
FIG. 5 is an end view of the storage tank system of FIG. 3 taken along line 5—5.

In the embodiment of the invention discussed with reference to FIGS. 3-5 the continuous sheet of fibrous material 32 serves the dual function of being a separating material and a part of an outer wall section. The sheet of material is about 0.05 inches to about 1.5 inches thick. The resinous material applied to the top surface of the fibrous material forms the outer wall sections and bonds the wall sections to the support ribs. Complete penetration of resin into the fibrous material is avoided. In effect the portion of the fibrous material sheet adjacent the inner tank is a separating material and the top surface portion together with the resinous material forms the outer wall sections.

The minimum thickness of the separating material must be sufficient to prevent the subsequently applied outer wall from adhering to the storage tank. Accordingly, any shrinkage resulting from formation of the outer wall must be accounted for by having a sealed sheet material thick enough to be partially collapsed, but not compressed to the extent a seal is formed.

Figure 6:
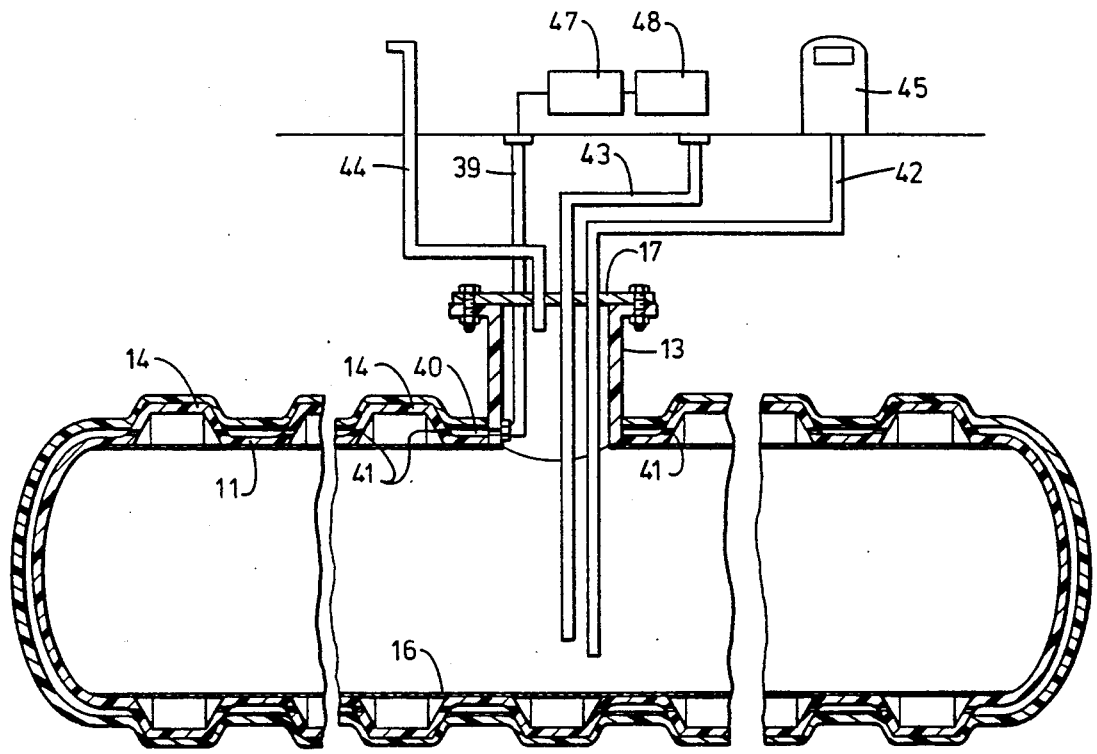
FIG. 6 is a side view of a storage tank system of this invention illustrating the use of monitor means.
Figure 7:
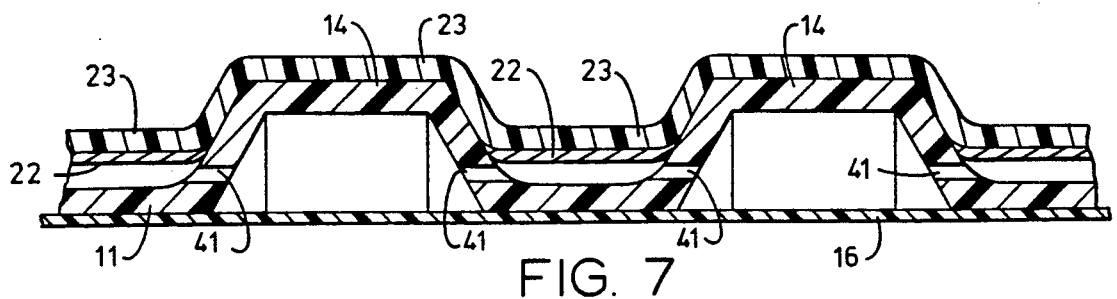
FIG. 7 is an enlarged sectional view of two support ribs of the storage tank system of FIG. 6.

With reference to FIGS. 6 and 7 there is shown a storage tank system 10 of the type described in FIG. 1 wherein the spaces between the support ribs are monitored. An access tube 39 extends from ground level through manhead 13 and access hole 40 so as to be in communication with the closed space. Preferably, the spaces enclosed by the rib side walls and the spaces formed by outer wall 20 are in communication. This is accomplished in one method by laying at least one aperture tube along the length of the inner tank 11 prior to placing the ribs thereon. Subsequent steps of securing the ribs to the inner tank, and forming the outer wall are done in a fashion above described. Preferably, at least two aperture tubes are used with one being positioned along the bottom of the tank and one along the top of the tank. Alternatively, a tube or rod is used in place of the aperture tube and removed after the final outer wall section is formed. The result being a tank system with a tunnel 41 extending the length of the inner tank's outside surface. Still other ways can be used to provide communication throughout the enclosed areas.

Secondary containment of liquid stored in storage tank 11 is provided by the rib interiors and the outer wall sections 21. Monitoring of the containment means is readily accomplished when said containment space is continuous. The aperture tube or tunnel provides the communication.

Also shown in FIG. 6 are features found on a typical underground storage tank system. Thus, a manhead cover 17 with attachment means (nuts and bolts) provides a sealed primary containment of the gasoline. Access lines comprised of dispensing line 42, fill line 43 and vent pipe 44 extend through the manhead cover 17. Dispensing line 42 extends to dispenser 45.

Any of well know and commercially available monitor means are used for monitoring the spaces between ribs or the total containment space. For example, the closed space can be placed either under a non-atmospheric pressure, i.e. a positive or negative air pressure. Detection means associated with the closed space is capable of detecting any change in pressure resulting from a leak in the overlay or the storage tank. As shown in FIG. 6, there is provided a means for maintaining the closed space under a negative pressure. Conventional vacuum pump 47, together with an associated pressure regulator can be used. A pressure change sensor 48 is a part of the detection means. A pressure gauge serves this purpose adequately. Optionally, an alarm system can be electronically linked with the pressure sensor to audibly or visually warn of a preset significant pressure change. A vacuum is preferred because of a resultant increased composite strength of the storage tank system.

Another embodiment of the detection means utilizes an analyzer capable of detecting the liquid being stored. Thus, the detection means comprises the analyzer which is in communication with the closed space. Preferably, a vacuum means for withdrawing gaseous material from the closed space is used for the purpose of obtaining a sample. Thus, in FIG. 6, element 48 is an analyzer capable of detecting selected liquids instead of a pressure change sensor.

Still another detection means utilizes a probe which extends through the access tube 39 so as to monitor for leakage at or near the bottom of the closed space. The probe is capable of detecting preselected liquids or gases. In this embodiment, leakage will ultimately seep to the bottom of the closed space and be detected.

All the leak detection means discussed above can be electronically linked with an alarm system to audibly or visually warn of a pre-set significant change in the closed spaces. The leak detection means and secondary containment means allow for an early warning of a deterioration of either the primary or secondary containment means thereby permitting the necessary repair work to be done before any significant soil or water contamination has occurred.

While the invention has been described with respect to preferred embodiments, it is understood that various modifications may be made without departing from the spirit of the subject invention as defined by the appended claims. For example, the ribs can be spaced laterally around the inner tank instead of circumferentially. The ribs, themselves, can be any geometric shape desired including square-, rounded or trapezoidal-shaped. The outer wall sections can also be formed such that the top surface of the inner tank is exposed to allow a convenient means of attaching various access lines. All obvious variations are within the scope of the claims.

What is claimed is:

1. A method of building a double walled ribbed storage tank system using an inner storage tank formed of a fibrous reinforced resinous material, said inner storage tank having a cylindrical-shaped main body with a set of integral spaced protruding support ribs extending circumferentially around an exterior of the main body to form a generally contoured exterior with recesses between the support ribs and further having an end cap at each end of the main body, comprising:
   (a) applying outer wall sections between adjacent support ribs of the cylindrical-shaped main body so as to be at least partially separated from the main body to create a space between each outer wall section and the main body; and
   (b) bonding each outer wall section to the adjacent support ribs on side walls thereof at a distance of less than about 90% of the height of the support ribs as measured from an exterior surface of the cylindrical-shaped main body such that the support ribs partially protrude from the outer wall sections.

2. The method of claim 1 wherein each outer wall section is bonded to the adjacent support ribs at a distance less than about 75% of the height of the ribs.

3. The method of claim 2 wherein each outer wall section is bonded to the adjacent support ribs at a distance of from about 1% to about 50% of the height of the ribs.

4. The method of claim 1 wherein each outer wall section is formed of fibrous reinforcing material and resinous material.

5. The method of claim 1 further comprising placing a separating material between the adjacent support ribs of the cylindrical-shaped main body prior to the applying of the outer wall sections to ensure that the outer wall sections remain independent of the main body.

6. The method of claim 5 wherein the separating material is sealed on at least one side.

7. The method of claim 6 wherein the separating material is a foam, matting, net, screen or mesh which has its outer surface sealed with a polymeric material.

8. The method of claim 1 further comprising placing an aperture tube along the length of the cylindrical-shaped main body and through the support ribs so as to provide a means of communication for continuous monitoring of the inner storage tank and outer wall sections to detect leakage.

9. The method of claim 1 wherein the outer wall sections are formed from solid sheet materials.

10. The method of claim 1 further comprising positioning outer end caps over the inner storage tank's ends and bonding each outer end cap to a support rib with fibrous reinforcing material and resinous material.

* * * * *